UNITED STATES PATENT OFFICE.

JULIUS SCHMIDLIN, OF BERGEN, NEAR FRANKFORT-ON-THE-MAIN, AND MAX FISCHER, OF FRANKFORT-ON-THE-MAIN, GERMANY.

MANUFACTURE OF CHLORINATED PRODUCTS OF XYLENE, ALDEHYDOBENZOIC ACIDS, AND DYESTUFFS THEREFROM.

1,219,166.  Specification of Letters Patent.  Patented Mar. 13, 1917.

No Drawing.  Application filed May 16, 1916. Serial No. 97,890.

*To all whom it may concern:*

Be it known that we, JULIUS SCHMIDLIN, professor of chemistry, a citizen of the Swiss Republic, residing at Borngasse 7, Bergen, near Frankfort-on-the-Main, Germany, and MAX FISCHER, Ph. D., a citizen of the Swiss Republic, residing at present at Roederbergweg 139, Frankfort-on-the-Main, Germany, have invented certain new and useful Improvements in the Manufacture of Chlorinated Products of Xylene, Aldehydobenzoic Acids, and Dyestuffs Therefrom, of which the following is a full description.

We have discovered that xylenes halogenated in the nucleus, such as mono-, di-, tri- and tetrachloroxylenes may at elevated temperatures and medium exposure to light be further chlorinated to new chlorin derivatives with four chlorin atoms in the side chains. If these bodies $R(CHCl_2)_2$, either direct or after saponification to the corresponding dialdehydes $R(CHO)_2$ previously chlorinated in the nucleus, are condensed with o-oxycarbonic acids such as o-cresotinic acid, and subsequently oxidized with sodium nitrite in concentrated sulfuric acid solution, blue dye-stuffs are obtained which may be afterchromed.

The above mentioned chlorination in the side chains may also be carried on until five chlorin atoms have been introduced in the side chains; these new chlorin derivatives

may subsequently, that is either direct or after saponification, be condensed with o-oxycarbonic acids to the corresponding aldehydobenzoic acids

chlorinated in the nucleus, and may be oxidized with sodium nitrite to new bright bluish-violet dyestuffs.

Instead of starting from the ready xylenes chlorinated in the nucleus, it is also feasible to emanate from the o-, m- or p-xylene, or from technical xylene (which latter contains m-xylene as the principal ingredient), and to chlorinate in one operation first cold and in the dark up to the desired number of halogen atoms in the nucleus, and then to carry through the chlorinating in the side chains at elevated temperatures and under exposure to light.

The process of working is illustrated by the following examples:

*Production of 1.3-di(dichloromethyl)-trichlorobenzene.*

Example I: Under the influence of light a current of chlorin is led into trichloro-m-xylene or its analogous product prepared with technical xylene at 120° C. until the increase in weight or in density announces the introduction of four chlorin atoms. The colorless liquor possessing a boiling point of 330–331° C. may be purified by distillation.

In the same manner the following bodies derived from pure or mixed o- m- and p-xylenes or from the mixtures contained in the technical xylene may be obtained.

1.3 - di(dichloromethyl) - monochlorobenzene, boiling point 291–292° C.

1.3 - di(dichloromethyl) - dichlorobenzene, boiling point 312–313° C.

1.3 - di(dichloromethyl) - tetrachlorobenzene, boiling point 359–360° C., melting point 83° C.

1.4 - di(dichloromethyl) - dichlorobenzene, boiling point 313–316° C.

1.4 - di(dichloromethyl) - tetrachlorobenzene, boiling point above 360° C., melting point 168° C.

1.2 - di(dichloromethyl) - trichlorobenzene, boiling point 322–324° C.

*Production of 1-dichloromethyl-3-trichloromethyl-trichlorobenzene.*

Example II: Under the influence of light a current of chlorin is led into trichloro-m-xylene or into the analogous product derived from technical xylene until the increase in weight or in density announces the introduction of five chlorin atoms. The distilled product represents a colorless liquor with a boiling point of 339–340° C.

*Production of 1-dichloromethyl-3-trichloromethyl-dichlorobenzene.*

Example III: Under the influence of light and at a temperature of 120° C. a current of chlorin is led into dichloro-m-xylene or into the product derived from technical xylene until the increase in weight or in density announces the introduction of five chlorin atoms. The distilled product possesses a boiling point of 321–322° C.

The following analogous products have been obtained in the same manner:

1-dichloromethyl 4-trichloromethyl-dichlorobenzene, boiling point 322–324° C.

1-dichloromethyl 4-trichloromethyl-trichlorobenzene, decomposes at 360° C., melting point 120° C.

All these described chlorinated products containing only three chlorin atoms in the nucleus may also be obtained according to a new manner of working by starting from xylene.

*Production of 1-dichloromethyl-3-trichloromethyl-trichlorobenzene.*

Example IV: m-xylene or the technical xylene is submitted to a current of chlorin in total darkness and cooled down to 0–15° C. until a sample shows the presence of three halogen atoms which cannot be substituted by means of potassium methylate. Thereupon the temperature is raised to 120° C. and under the influence of light the chlorinating is continued until further five chlorin atoms have been introduced which may be substituted by means of potassium methylate.

*Conversion of 1-dichloromethyl-3-trichloromethyl-trichlorobenzene into trichloro-aldehydo-m-benzoic acid.*

Example V: The chlorinated product is dissolved in about 10 parts of concentrated sulfuric acid while heating to 90–100° C. and stirring for 8 hours. The aldehydo-benzoic acid is precipitated by ice water and recrystallized out of hot water in form of small shining leaflets. It melts at 214° C. and dissolves readily in alkali and in carbonate of soda.

*Conversion of 1-dichloromethyl-3-trichloromethyl-dichlorobenzene into dichloroaldehydo-m-benzoic acid.*

Example VI: The chlorinated product is treated with about 10 parts of concentrated sulfuric acid while stirring at 90–100° C. Precipitation is brought about by pouring the solution into ice water; the product obtained is recrystallized out of hot water. The new aldehydo-benzoic acid is obtained in small brilliant leaflets, it melts at 160° C. and is readily soluble in alkalis and in carbonate of soda.

*Production of the dyestuffs derived from trichloroaldehydo-m-benzoic acid.*

Example VII: 25 parts of trichloroaldehydo-m-benzoic acid are allowed to act on 30 parts of o-cresotinic acid and 50 parts of concentrated sulfuric acid until the aldehyde has disappeared. The leuco compound is oxidized by 7 parts of sodium nitrite, finally heating until the formation of the dyestuff is complete. The dyestuff is precipitated by ice water in form of reddish-brown flakes. The dyestuff is difficultly soluble in water, in carbonate of soda it dissolves with a brownish-orange color and in caustic soda with a bluish-violet color. Out of acid baths it dyes wool brownish-red shades which turn an intense bluish-violet by treating with bichromate.

In the place of trichloroaldehydo-m-benzoic acid it is feasible to use 1-dichloromethyl-3-trichloromethyltrichlorobenzene which may be condensed direct with o-cresotinic acid or which is previously treated with concentrated sulfuric acid heating to 90° C. and hereafter condensing after cooling down with o-cresotinic acid. As oxidizing agents nitric acid, nitrated compounds or concentrated or fuming sulfuric acid may likewise be employed.

When starting from dichloroaldehydo-m-benzoic acid or from 1-dichloromethyl-3-trichloromethyldichlorobenzene, otherwise working according to the same method, an analogous dyestuff is obtained.

Having now particularly described and ascertained the nature of our said invention and in what manner the same is to be performed, we declare that what we claim is:—

1. The process of producing dyestuffs of the triphenylmethane series which consists in chlorinating xylenes chlorinated in the nucleus, at elevated temperatures (100–130° C.) and under exposure to light until further four chlorin atoms have been introduced in the side chains, then subsequently condensing these new chlorin derivatives with ortho-cresotinic acid to the leuco compound, after saponification to chlorinated dialdehydes by means of concentrated sulfuric acid, and oxidizing the leuco compound with sodium nitrite in concentrated sulfuric acid solution to the above described dyestuff, substantially as described.

2. The process of producing new dyestuffs of the triphenylmethane series, which consists in chlorinating xylenes chlorinated in the nucleus at elevated temperatures (100–130° C.) and under exposure to light until further five chlorin atoms have been introduced in the side chains, then subsequently condensing these new chlorin derivatives with ortho-cresotinic acid after saponification to chlorinated aldehydecarbonic acids by means of concentrated sulfuric acid to the leuco-compound, and finally oxidizing same with sodium nitrite in concentrated sulfuric acid solution to the above described dyestuff, substantially as described.

3. As new products for manufacturing the emanating herein described new aldehydobenzoic acids chlorinated in the nucleus, which are soluble in hot water, being obtained therefrom in fine crystals, dissolving also in cold diluted alkalis and alkaline carbonates, substantially as described.

4. As new emanating products for manufacturing the new triphenylmethane dyestuffs herein described, produced from aldehydobenzoic acids chlorinated in the nucleus and ortho-cresotinic acid, being orange-red powders in the dry state, dissolving in water with a yellow-brown color, in diluted alkali with an intense violet-blue color, dyeing wool from an acid bath a brown-red shade, and yielding after chroming bright, beautiful, violet-blue dyeings of very good fastness to washing and milling, substantially as described.

In witness whereof we have hereunto signed our names this 10th day of April, 1916, in the presence of two subscribing witnesses.

JULIUS SCHMIDLIN.
MAX FISCHER.

Witnesses:
 JEAN GRUND.
 CARL GRUND.